H. RAFLOVICH.
ELASTIC TIRE BLOCK FOR VEHICLE WHEELS.
APPLICATION FILED MAR. 3, 1915.
1,183,032.
Patented May 16, 1916.
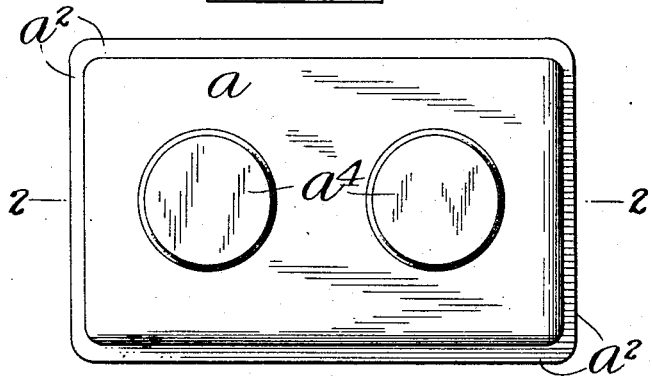
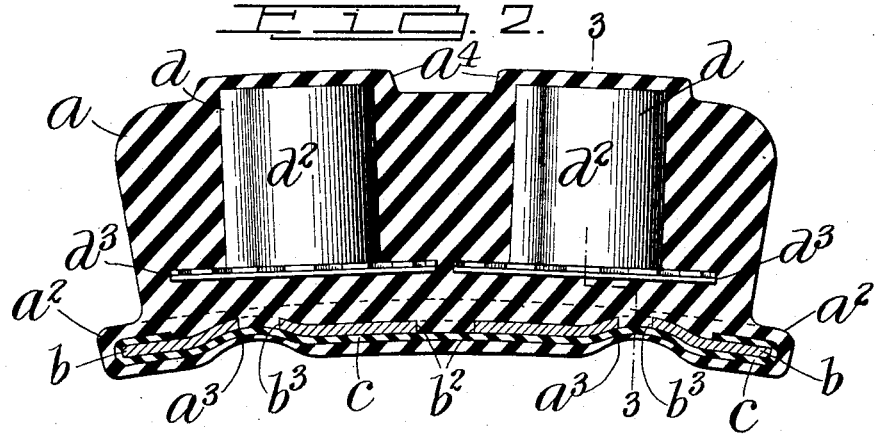
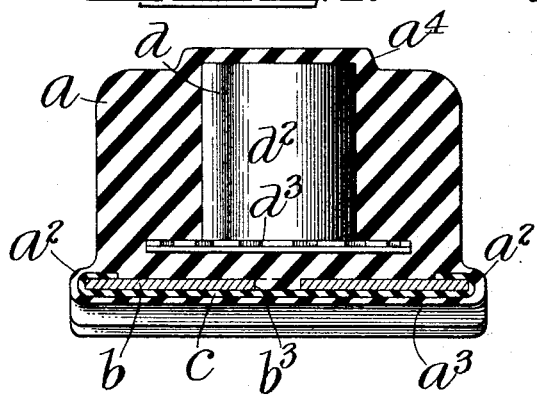
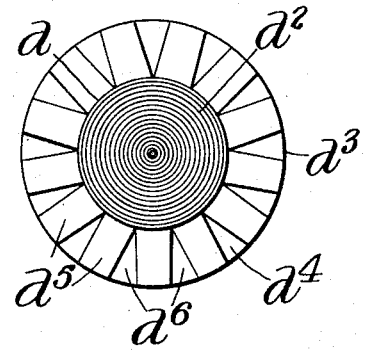
Witnesses:
N. E. Thompson
C. Mulreany
Inventor
Harry Raflovich,
By his Attorneys
Edgar Natette

UNITED STATES PATENT OFFICE.

HARRY RAFLOVICH, OF NEW YORK, N. Y.

ELASTIC TIRE-BLOCK FOR VEHICLE-WHEELS.

1,183,032. Specification of Letters Patent. Patented May 16, 1916.

Application filed March 3, 1915. Serial No. 11,690.

*To all whom it may concern:*

Be it known that I, HARRY RAFLOVICH, a citizen of the United States, and residing at Bronx, New York, in the county of New York and State of New York, have invented certain new and useful Improvements in Elastic Tire-Blocks for Vehicle-Wheels, of which the following is a specification, such as will enable those skilled in the art to which it appertains to make and use the same.

This invention relates to tire blocks for use in forming elastic tires for vehicle wheels and especially wheels of power driven vehicles, and the object of the invention is to provide tire blocks of this class which will possess the required elasticity and which will also be comparatively strong and durable, and also comparatively inexpensive, and which are also provided in the construction thereof with anti-skid features or devices.

The invention is fully disclosed in the following specification, of which the accompanying drawing forms a part, in which the separate parts of my improvement are designated by suitable reference characters in each of the views, and in which:—

Figure 1 is a face view of a tire block made according to my invention; Fig. 2 a partial section on the line 2—2 of Fig. 1; Fig. 3 a section on the line 3—3 of Fig. 2; and, Fig. 4 a plan view of a reinforcing and anti-skidding device forming a part of my improved tire block or blocks and two of which are preferably employed in each block.

In the practice of my invention, I provide a tire block of the class specified, which comprises an oblong and approximately rectangular body portion $a$, the base or inner side of which is provided with an attaching flange or rim $a^2$ which extends entirely around the body portion, and said block is formed of rubber or a combination of rubber and canvas, or of any suitable or similar material, and in the base or inner side thereof and extending into the flange or rim $a^2$ is a metal plate $b$ having a central aperture $b^2$ and other apertures $b^3$ in the opposite end portions thereof, and at the points where the apertures $b^3$ are formed the plate $b$ is raised so as to form convex top portions and concave bottom portions, transversely of said plate, and this construction forms corresponding transverse concavities or recesses $a^3$ in the bottom of the block or blocks.

Placed on the bottom of the plate $b$ is a supplemental sheet $c$ of rubber, rubber and canvas or similar material, and the edge portions of which are folded over the edge portions of the plate $b$, and the material of the body portion of the block fills the apertures $b^2$ and $b^3$, and is secured to the sheet $c$, and said sheet is secured to the bottom portion of the block on which it rests, all these operations being performed in the usual manner, in the formation of the block, and by the usual process. The block is also provided with one or more reinforcing and anti-skidding members or devices $d$ which comprise body portions $d^2$ and base flanges $d^3$, and the body portions $d^2$ are cylindrical in form and composed of rolled up strips or sheets of canvas, or rubber and canvas as clearly indicated in Fig. 4, and the base flanges $d^3$ comprise bottom members $d^4$ and top members $d^5$ having V-shaped recesses $d^6$, and these reinforcing and anti-skidding devices are formed in, or placed in, the block or blocks in the process of forming or making said block or blocks, and in this operation said block or blocks are preferably made of two similar parts vulcanized or otherwise secured together and in the inner faces of which the reinforcing and anti-skidding devices $d$ are secured.

The body portion of the reinforcing and anti-skidding devices $d$ is radially arranged and the outer ends thereof are preferably projected slightly beyond the main outer face of the tire block or blocks but are covered by raised portions $a^4$ of said block or blocks, and these raised portions $a^4$ also serve as anti-skidding devices, and when they are worn off in the use of the block, the outer ends of the body portions $d^2$ of the reinforcing and anti-skidding devices $d$ take their place and operate in the same manner to produce the desired result.

The specific construction of the base flanges $d^3$ of the reinforcing and anti-skidding devices $d^2$ is designed for the purpose of securing and locking said devices in the block or blocks, it being understood that the material of the block or blocks fills the spaces or recesses $d^6$, but my invention is not limited to any particular form for the base flanges $d^3$ of the parts $d^2$, nor to other exact details of the construction herein shown and described, and changes therein and modifications thereof may be made, within the scope of the appended claim, without departing from the spirit of my invention or sacrificing its advantages.

It will be understood that the plate $b$ in the base flange or rim portion of the block is designed to reinforce said base flange or rim portion and to facilitate the connection of the block or blocks with the rim of a wheel so as to form a tire for said rim, and my invention is also not limited to any particular means for securing the tire block or blocks to the rim of a wheel, but the transversely concave portions $a^3$ in the bottom of the block or blocks facilitate this operation as shown and described in a companion application filed, and of equal date herewith, Serial No. 11,691, and in which are shown and described tire blocks similar in form to that described and claimed herein together with means for securing the same to the rim of a wheel.

Having fully described my invention, what I claim as new and desire to secure by Letters Patent, is:—

A tire block composed of a body part approximately rectangular in form and having a projecting base or rim portion in which is secured a reinforcing plate which extends into said base or rim portion and beyond the body portion of the block, said reinforcing plate being provided at one side thereof with a rubber and canvas covering the edge portions of which are folded to overlap the edge portions of said reinforcing plate, and said reinforcing plate being also provided with depressions forming corresponding recesses in the bottom of the tire block by means of which said tire block is held against circumferential movement.

In testimony that I claim the foregoing as my invention I have signed my name in presence of the subscribing witnesses this 1st day of March, 1915.

HARRY RAFLOVICH.

Witnesses:
C. MULREANY,
H. E. THOMPSON.

Copies of this patent may be obtained for five cents each, by addressing the "Commissioner of Patents, Washington, D. C."